(12) United States Patent
Nishida et al.

(10) Patent No.: US 6,267,091 B1
(45) Date of Patent: Jul. 31, 2001

(54) ROTARY VALVE ASSEMBLY AND ENGINE INDUCTION SYSTEM USING THE ROTARY VALVE ASSEMBLY

(75) Inventors: Masaya Nishida, Yokohama; Yuji Kudo, Kanagawa; Teruhiko Minegishi, Ibaraki; Kunio Sato, Ibaraki; Kazuo Muneoka, Ibaraki, all of (JP)

(73) Assignees: Nissan Motor Co., Ltd., Yokohama; Hitachi, Ltd., Tokyo; Hitachi Car Engineering Co., Ltd., Hitachinaka, all of (JP)

( * ) Notice: Subject to any disclaimer, the term of this patent is extended or adjusted under 35 U.S.C. 154(b) by 0 days.

(21) Appl. No.: 09/471,195

(22) Filed: Dec. 23, 1999

(30) Foreign Application Priority Data

Dec. 25, 1998 (JP) .................................................. 10-369519

(51) Int. Cl.$^7$ ..................................................... F02B 27/02
(52) U.S. Cl. ..................................................... 123/184.55
(58) Field of Search ........................ 123/184.55, 184.56, 123/184.61, 184.59, 336

(56) References Cited

U.S. PATENT DOCUMENTS

| | | | |
|---|---|---|---|
| 5,129,368 | * | 7/1992 | Kristl et al. ...................... 123/184.55 |
| 5,546,900 | * | 8/1996 | Adamek et al. ................. 123/184.55 |
| 5,870,988 | * | 2/1999 | Fujimori et al. ................ 123/184.55 |

* cited by examiner

Primary Examiner—Noah P. Kamen
Assistant Examiner—Hyder Ali
(74) Attorney, Agent, or Firm—Foley & Lardner

(57) ABSTRACT

A rotary valve assembly for controlling flow passing through substantially parallel passages, is disclosed. A wall has a cylindrical bore extending transverse to the passages. An elongated rotor is rotatably supported at opposed ends thereof within the cylindrical bore. A plurality of axially spaced valves are disposed on the rotor so as to open and close the passages. A plurality of wall portions are disposed between the valves so as to isolate the adjacent passages. A C-ring is disposed on the respective wall portion of the rotor in sealing contact with the wall surface surrounding the cylindrical bore. An O-ring is disposed axially adjacent to the C-ring and adapted for reducing radial vibration of the rotor and cooperating with the C-ring to prevent leakage flow through the adjacent passages.

29 Claims, 7 Drawing Sheets

ROTARY VALVE ASSEMBLY AND ENGINE INDUCTION SYSTEM USING THE ROTARY VALVE ASSEMBLY

BACKGROUND OF THE INVENTION

This invention relates to a rotary valve assembly adapted for simultaneously opening and closing multiple passages that are arranged substantially parallel to each other, and an engine induction system using the rotary valve assembly.

U.S. Pat. No. 5,546,900 discloses an intake assembly for a multi-cylinder internal combustion engine. The intake assembly includes intake ducts extending substantially parallel to each other and a rotor provided in the form of a control shaft and inserted in an elongated bore extending across the intake ducts. The rotor is operative to open and close the respective intake ducts to provide induction characteristics variable depending on operating conditions of the engine. C-rings are disposed in circumferential grooves provided on the rotor. The C-rings expandable radially outwardly, are in sealing contact with a wall defining the bore.

SUMMARY OF THE INVENTION

In the conventionally proposed arrangement, there exists a radial clearance between the bottom of the groove and the inner circumferential surface of the corresponding C-ring disposed therein. When the engine operates, the rotor undergoes vibration in the bore due to engine vibration. It is likely that the C-ring then bumps against the bottom of the groove, whereby noise is caused. Especially, when the rotor is in a closed position where the intake duct is closed, the vibration of the rotor is increased due to the intake pulsation occurring in the intake assembly. This leads to frequent occurrence of noise. In addition, in a case where the intake duct and the rotor are made of synthetic resin, aluminum, magnesium or the like, for the purpose of reducing weight or cost, noise will tend to be generated between the C-ring and the corresponding groove because of the relatively low rigidity and low surface density of these materials.

It is an object of the present invention to provide a rotary valve assembly and an engine induction system that are capable of eliminating the above-described disadvantages of the conventionally proposed technique.

It is a further object of the present invention to provide a rotary valve assembly and an engine induction system that effect improved operating performance thereof.

According to one aspect of the present invention, there is provided a rotary valve assembly for controlling flow passing through substantially parallel passages, comprising:

a valve housing including a cylindrical bore extending transverse to the passages and a wall surface defining the cylindrical bore;

a rotor having a longitudinal rotation axis and rotatably supported at opposed ends thereof within said cylindrical bore, said rotor including a plurality of axially spaced valves adapted to open and close the passages, and a plurality of wall portions disposed between the axially spaced valves and adapted for isolating the passages;

a first ring disposed on the respective axially spaced wall portion of said rotor in sealing contact with the wall surface of said valve housing; and a second ring adapted for reducing radial vibration of said rotor and cooperating with said first ring to prevent leakage flow through the adjacent passages, said second ring being disposed axially adjacent to said first ring.

According to a further aspect of the present invention, there is provided an engine induction system for providing air to multiple cylinders, comprising:

an intake manifold including a main collector chamber commonly connected to the cylinders, a plurality of branch passages extending substantially parallel to each other and connecting the main collector chamber and the cylinders, an auxiliary collector chamber disposed substantially parallel to the main collector chamber, a plurality of communication passages connecting the branch passages with the auxiliary collector chamber, a cylindrical bore extending transverse to the communication passages, and a wall surface defining said cylindrical bore;

a rotor having a longitudinal rotation axis and rotatably supported at opposed ends thereof within said cylindrical bore, said rotor including a plurality of axially spaced valves adapted to open and close the communication passages and a plurality of wall portions disposed between the axially spaced valves and adapted for isolating the communication passages;

a first ring disposed on the respective wall portion of the rotor in sealing contact with the wall surface of the intake manifold; and a second ring adapted for reducing a radial vibration of the rotor and cooperating with said first ring to prevent leakage flow through the adjacent communication passages, said second ring being disposed axially adjacent to said first ring.

According to a still further aspect of the present invention, there is provided a rotary valve assembly, comprising:

a wall means defining a cylindrical bore:

a shaft disposed within said cylindrical bore with a radial gap between said wall means and said shaft, said shaft having a rotation axis and rotatably supported at opposed ends thereof, said shaft including a plurality of axially spaced valves;

a ring adapted to reduce radial vibration of said shaft as well as serve for sealing said radial gap; and a ring support supporting said ring, said ring support being disposed near a loop of the radial vibration of said shaft.

DETAILED DESCRIPTION OF THE INVENTION

Figure 1:
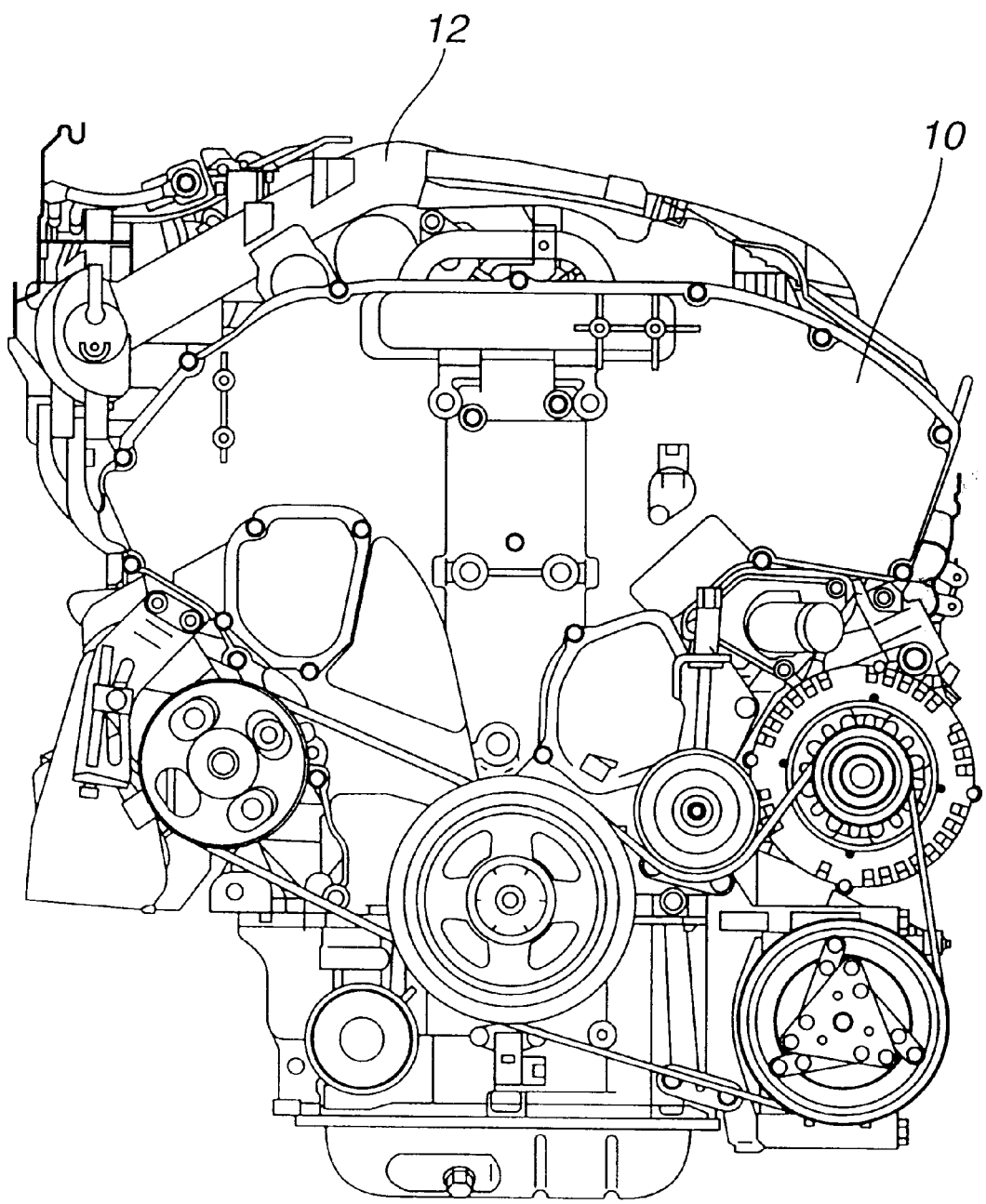
FIG. 1 is a front side view of a V-type, six-cylinder engine to which an induction system incorporating a rotary valve assembly according to the present invention, is applied.

Referring to the drawings, a rotary valve assembly incorporated into a variably controlled induction system for a V-type, six-cylinder internal combustion engine, according to the present invention, will be explained hereinafter.

As illustrated in FIG. 1, the V-type, six-cylinder internal combustion engine 10 has an induction system including an intake manifold 12. The intake manifold 12 is made of a synthetic resin material by injection molding.

Figure 2:
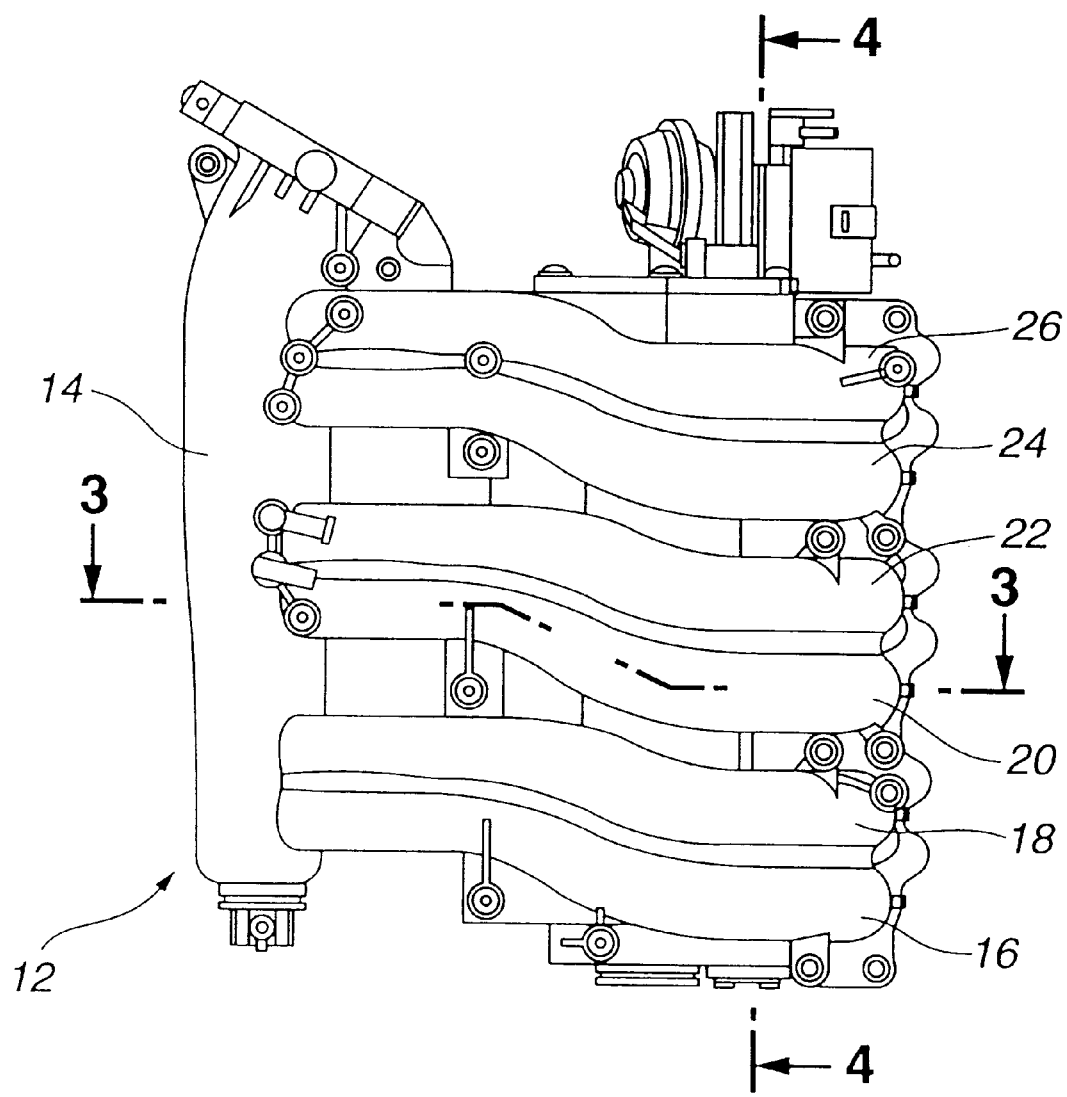
FIG. 2 is a partial plan view of FIG. 1, showing an intake manifold.

As illustrated in FIG. 2, the intake manifold 12 includes a main intake manifold portion 14 and six branch passages 16, 18, 20, 22, 24 and 26 connected with the main intake manifold portion 14 and extending substantially parallel to each other. The main intake manifold portion 14 is connected with a throttle body, not shown. The main intake manifold portion 14 is formed of an elongated cylindrical shape having a longitudinal axis and defines a main collector chamber therein. The six branch passages 16–26 extend in substantially a same direction, namely, substantially perpendicular to the longitudinal axis of the main intake manifold portion 14. Each of the six branch passages 16–26 has one end connected with the main intake manifold portion 14 and an opposite end connected with a predetermined one of cylinders No. 1 to No. 6 of the engine 10. The branch passages 16, 20 and 24 are connected with the cylinders No. 1, No. 3 and No. 5 in one bank and the branch passages 18, 22 and 26 are connected with the cylinders No. 2, No. 4 and No.6 in an opposite bank. These branch passages 16–26 are adapted to be connected to intake ports of the cylinders via a distributor, not shown.

Figure 3:
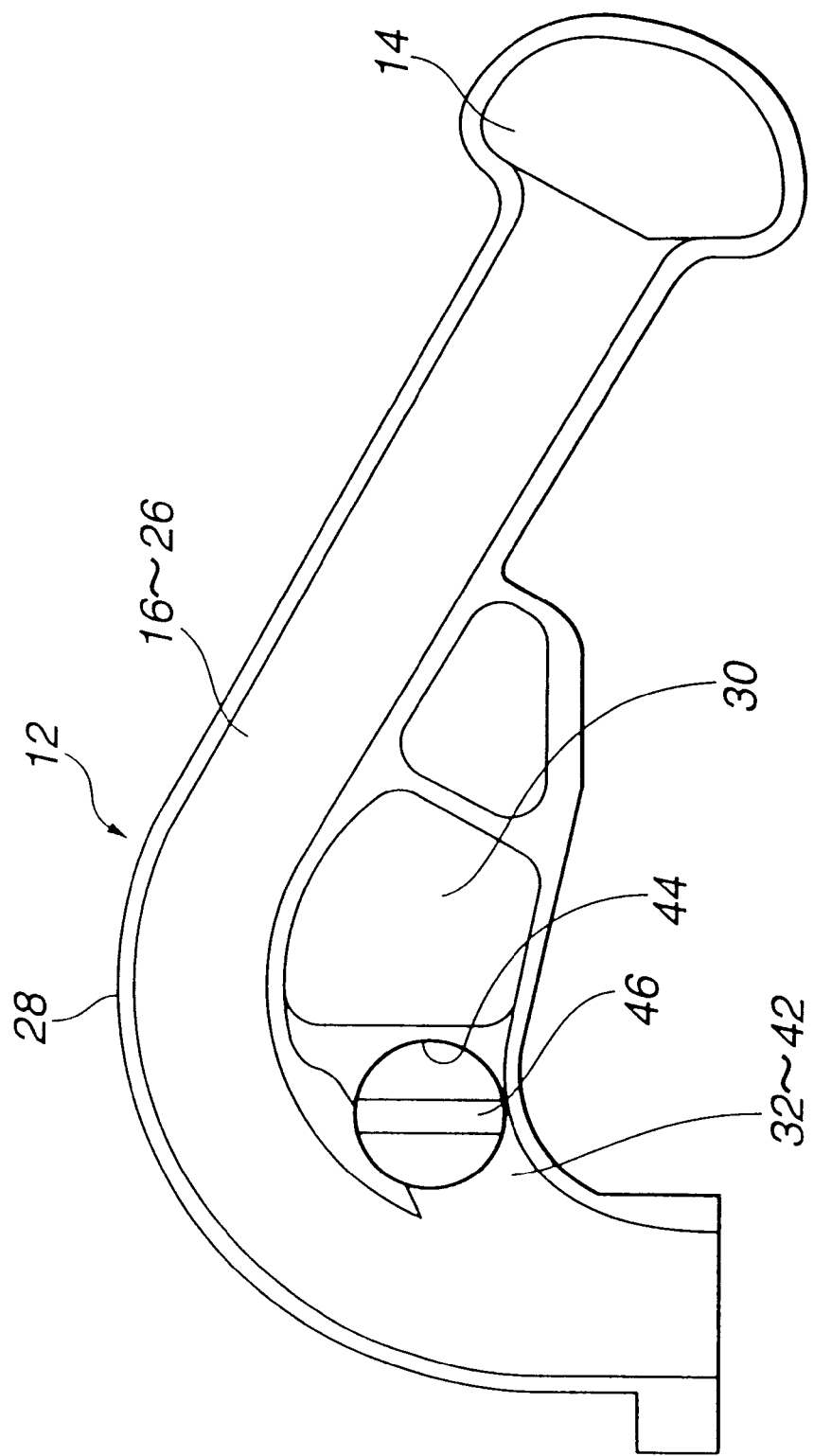
FIG. 3 is a section taken along the line 3—3 of FIG. 2, showing a rotor mounted to the intake manifold.

As illustrated in FIG. 3, the respective branch passage 16–26 has a curved intermediate portion 28 projecting upwardly. An auxiliary intake manifold portion 30 is disposed beneath the curved intermediate portion 28 of the respective branch passage 16–26. The auxiliary intake manifold portion 30 defines an auxiliary collector chamber disposed substantially parallel to the main collector chamber of the main intake manifold portion 14. The auxiliary collector chamber in the auxiliary intake manifold portion 30 communicates with the branch passages 16–26 only via six communication passages 32, 34, 36, 38, 40 and 42 that are divided from the branch passages 16–26, respectively. Similar to the branch passages 16–26, the communication passages 32–42 are arranged substantially parallel to each other and substantially perpendicular to the longitudinal axis of the main intake manifold portion 14.

Figure 4:
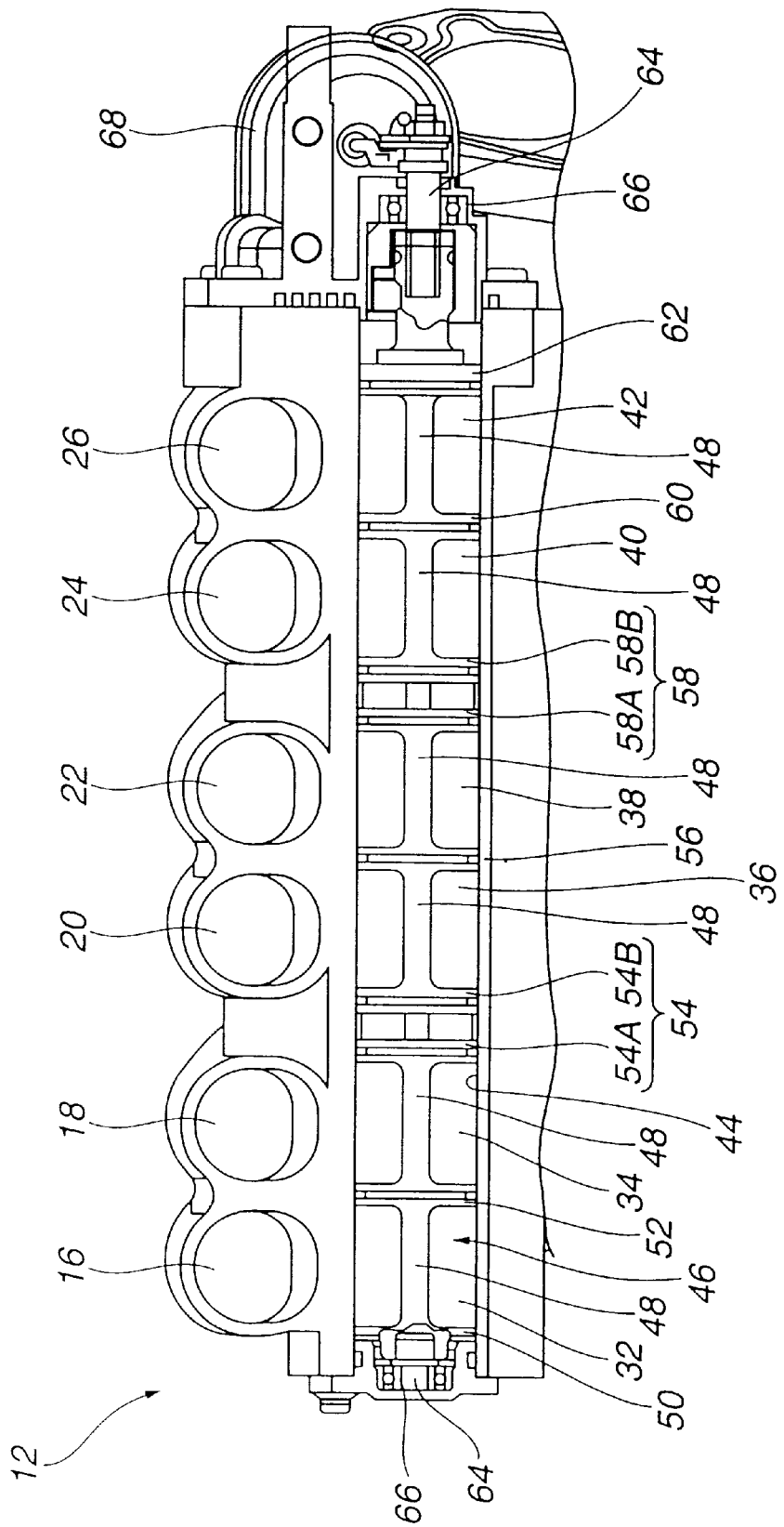
FIG. 4 is a section taken along the line 4—4 of FIG. 2.

As illustrated in FIG. 4, the intake manifold 12 includes a wall defining a cylindrical bore 44 that extends transverse to the six communication passages 32–42. The wall also defines six inlet ports communicating with the cylindrical bore 44 and connected with the communication passages 32–42 and the auxiliary collector chamber, and six outlet ports communicating with the cylindrical bore 44 and connected with the communication passages 32–42 and the branch passages 16–26.

A rotor 46 is disposed within the cylindrical bore 44 with a radial clearance or gap between an outer surface of the rotor 46 and a wall surface surrounding the cylindrical bore 44. The rotor 46 is in the form of an elongated shaft and has a longitudinal rotation axis X shown in FIG. 5. The rotor 46 is rotatably supported at its opposed tapered end portions 64 by ball bearings 66. The rotor 46 includes a plurality of axially spaced valves 48 and a plurality of wall portions 50, 52, 54, 56, 58, 60 and 62 disposed between the valves 48 and connecting the valves 48 in series in the axial direction of the rotor 46. The valves 48 and the wall portions 50–62 are formed integrally with the rotor 46 and made of a synthetic resin material. The valves 48 are formed into an axially and radially extending plate-like shape and located between the inlet ports and the outlet ports and opposed thereto. When the rotor 46 rotates about the axis X, the valves 48 rotate with the rotor 46 to open and close the communication passages 32–42. The valves 48 thus are operative to allow and prevent the communication between the auxiliary collector chamber in the auxiliary intake manifold portion 30 and the branch passages 16–26 upon rotation of the rotor 46. The wall portions 50–62 are formed into a disk shape extending substantially perpendicular to the axis X of the rotor 46. The wall portions 50 and 62 are disposed near the opposed end portions 64 and the wall portions 52–60 are arranged to isolate the communication passages 32–42 from each other. The wall portions 50–62 divide the cylindrical bore 44 into six chambers that communicate with the communication passages 32–42, respectively. Each of the wall portions 50–62 is so configured as to have an outer diameter thereof smaller than a diameter of the cylindrical bore 44 in order to eliminate friction resistance that will be caused by the contact between an outer surface of the wall portion 50–62 and the wall surface surrounding the cylindrical bore 44.

The rotor 46 is rotatively driven by an actuator 68 to move to a closed position where the valves 48 prevent a communication between the auxiliary collector chamber in the auxiliary intake manifold portion 30 and the branch passages 16–26. When the rotor 46 is in the closed position, an effective length of the induction system extends between the main collector chamber in the main intake manifold portion 14 and the intake ports of the cylinders. Then, the effective length is relatively great and increased. The increased effective length of the induction system provides a low-speed characteristic in which the engine torque output is improved at a relatively low revolution range. On the other hand, when the rotor 46 is rotatively moved by approximately 90 degrees from the closed position to an open position where the valves 48 allow the communication between the auxiliary collector chamber and the branch passages 16–26. When the rotor 46 is in the open position, the effective length of the induction system extends between the auxiliary collector chamber and the intake ports of the cylinders and thus the effective length is reduced. The reduced effective length of the induction system provides a high-speed characteristic in which the engine torque output is improved at a relatively high revolution range.

As shown in FIG. 4, the wall portion 54 between the adjacent communication passages 34 and 36 includes two axially adjacent wall portions 54A and 54B. The communication passages 34 and 36 are connected to the cylinders No. 2 and No. 3, respectively. Similarly, the wall portion 58 between the adjacent communication passages 38 and 40 includes two axially adjacent wall portions 58A and 58B. The communication passages 38 and 40 are connected to the cylinders No. 4 and No. 5, respectively.

Figure 5:
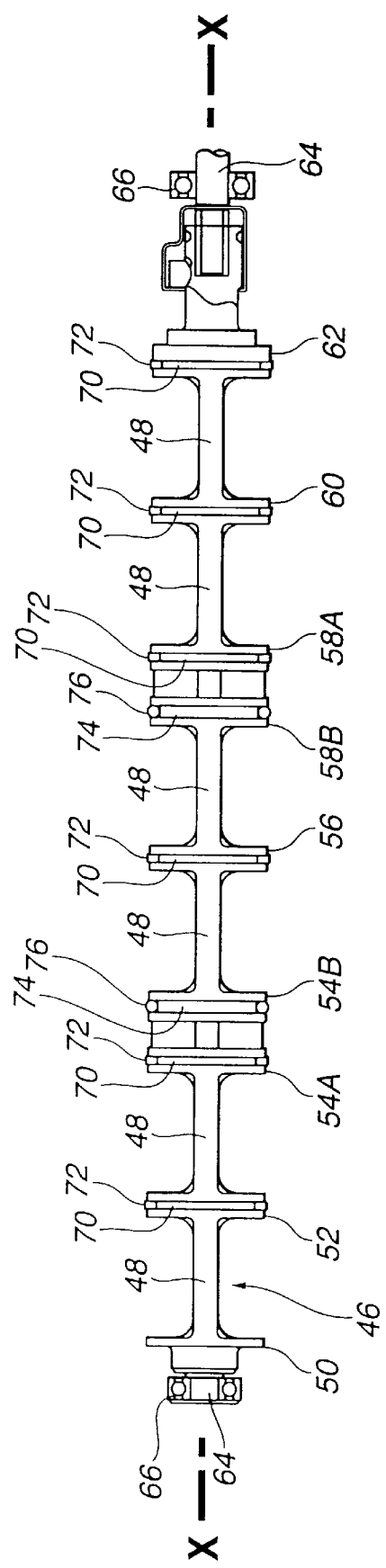
FIG. 5 is a side view of the rotor.

As shown in FIG. 5, the wall portions 52, 54A, 56, 58A, 60 and 62 are formed with grooves 70. The grooves 70 circumferentially extend on outer surfaces of the wall portions 52, 54A, 56, 58A, 60 and 62, respectively. C-rings 72 are received in the grooves 70, respectively. The C-rings 72 are made of an expandably resilient material including resin or metal such as spring steel. The C-rings 72 expand outwardly to be in sealing contact with the wall surface surrounding the cylindrical bore 44 of the wall of the intake manifold 12. The wall portions 54B and 58B are formed with grooves 74 circumferentially extending on outer surfaces thereof, respectively. O-rings 76 are received in the grooves 74 and supported on the wall portions 54B and 58B, respectively. The wall portions 54B and 58B thus act as ring supports for the O-rings 76. The O-rings 76 are made of a contractible and high-resilient material such as synthetic rubber and contracts inwardly to be in sealing contact with bottoms of the grooves 74.

Figure 6:
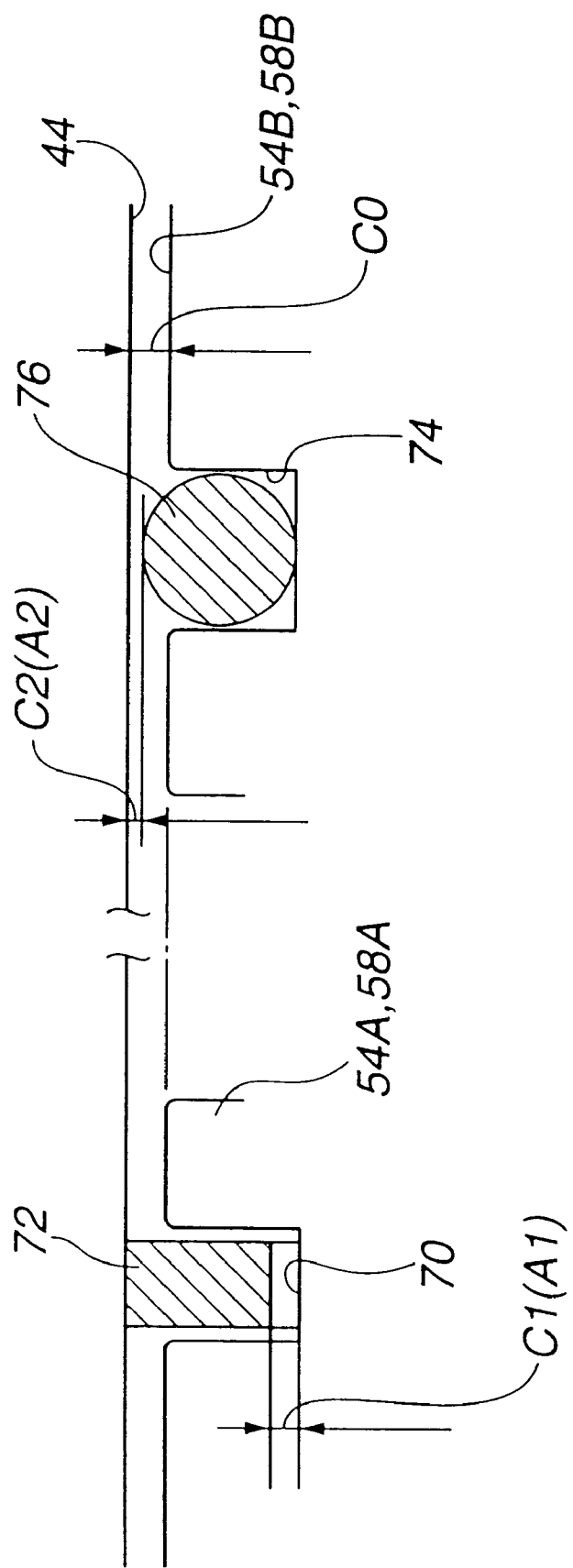
FIG. 6 is an enlarged view of a part of FIG. 4, showing a C-ring and an O-ring that are mounted to the rotor.

Referring to FIG. 6, the arrangement of the C-ring 72 and the O-ring 76 with radial clearances will be explained hereinafter. In this explanation, the "radial clearances" denoted by C0, C1 and C2 mean averages of the clearances generated in the radial direction of the rotor 46, respectively. FIG. 6 shows cross-sections of the C-ring 72 and the O-ring 76 and the corresponding grooves 70 and 74, taken along the axis X of the rotor 46.

As illustrated in FIG. 6, the radial clearance C0 is generated between the wall surface defining the cylindrical bore 44 of the wall of the intake manifold 12 and the outer surfaces of the wall portions 50–62 of the rotor 46. The C-ring 72 has a generally rectangular-shaped cross-section. Similarly, the groove 70 receiving the C-ring 72 has a generally rectangular-shaped cross-section. The C-ring 72 is out of contact with the bottom of the groove 70 while it is in contact with the wall surface surrounding the cylindrical bore 44 of the wall of the intake manifold 12. The C-ring 72 and the corresponding groove 70 thus cooperate to define the radial clearance C1 between an inner circumferential surface of the C-ring 72 and the bottom of the groove 70. The C-ring 72 has a sealing surface contacted with the wall surface surrounding the cylindrical bore 44 of the wall of the intake manifold 12. The O-ring 76 has a generally circular-shaped cross-section. The groove 74 receiving the O-ring 76 has a generally rectangular-shaped cross-section. The O-ring 76 is out of contact with the wall surface surrounding the cylindrical bore 44 while it is in contact with the bottom of the groove 74. The O-ring 76 and the corresponding groove 74 cooperate to define the radial clearance C2 between an outer circumferential round surface of the O-ring 76 and the wall surface defining the cylindrical bore 44 of the wall of the intake manifold 12. The outer circumferential round surface of the O-ring 76 acts as a damper surface as explained later. The O-ring 76 is contacted with the bottom of the groove 74 at its inner circumferential surface. The relationships between the radial clearances C0, C1 and C2 are represented by C0>C1>C2, wherein C2>0.

When the rotor 46 is in the closed position and radially vibrates within the cylindrical bore 44 due to intake pulsation or vibration of the engine that is applied thereto, the outer circumferential surface of the O-ring 76 comes into contact with the wall surface surrounding the cylindrical bore 44 before the inner circumferential surface of the C-ring 72 is brought into contact with the bottom of the groove 70. This is because there is provided the above-described difference between the radial clearances C1 and C2. The O-ring 76 reduces the radial vibration of the rotor 46 and damps impingement of the C-ring 72 against the bottom of the groove 70 because of the resilient force of the O-ring 76. The O-ring 76 thus serves for preventing the noise to be caused by the impinging of the C-ring 72 on the bottom of the groove 70. Even if the resiliency of the O-ring 76 is lowered due to aging, the effects of noise-reduction and vibration-reduction can be maintained with the arrangement of the C-ring 72 and the O-ring 76 with the radical clearances C1 and C2.

Especially, in this embodiment using the rotor 46 that includes the six valves 48 and the seven wall portions 50–62, the rotor 46 is subjected to a primary radial vibration having two nodes near the opposite end wall portions 50 and 62 and a secondary radial vibration having three nodes near the opposite end wall portions 50 and 62 and the intermediate wall portion 56. The wall portions 54B and 58B are located near loops of the respective primary and secondary vibrations. The two O-rings 76 supported on the wall portions 54B and 58B, therefore, serve for reducing the primary and secondary vibrations of the rotor 46 in the cylindrical bore 44 when the rotor 46 vibrates. Thus, the two O-rings 76 are minimum in number in this embodiment, serving for establishing the vibration-reduction and noise-reduction effects.

Further, with the provision of the radial clearance C2>0, the O-ring 76 is out of contact with the wall surface surrounding the cylindrical bore 44 under condition that there occurs no radial vibration or displacement of the rotor 46 relative to the wall surface surround the cylinder bore 44. Therefore, the sliding contact between the rotor 46 and the wall surface and the friction resistance caused thereby upon rotation of the rotor 46 can be eliminated. This can provide smooth operation of the rotor 46 and thus an improved performance of the rotary valve assembly. In addition, the O-ring 76 can be prevented from being deteriorated by the frictional contact and the life of the O-ring 76 can be increased, so that the smooth operation and the improved performance may be maintained for a longer duration.

Furthermore, the O-rings 76 on the wall portions 54B and 58B are located between the cylinders No. 2 and No. 3 and the cylinders No. 4 and No. 5, respectively, as well as the C-rings 72 on the wall portions 54A and 58A. The O-rings 76 and the C-rings 72 disposed axially adjacent to the O-rings 76 cooperate to prevent leakage flow through the adjacent induction system, namely, the adjacent communication passages 34, 36 and 38, 40 and the adjacent branch passages 18, 20 and 22, 24, and thus enhance the sealing between the adjacent induction system. The enhanced sealing can restrain intake interference to be caused between the adjacent cylinders, serving for improving torque output of the engine.

Specifically, as illustrated in FIG. 6, the C-ring 72 and the groove 70 cooperate to define a clearance area A1 circumferentially extending between the inner circumferential surface of the C-ring 72 and the bottom of the groove 70. The clearance area A1 includes an area circumferentially extending corresponding to the radial clearance C1 and a closed gap between circumferentially opposed ends of the C-ring 72. If the C-ring 72 has a relatively large closed gap, the clearance area A1 may be greater. The clearance area A1 is a non-seal area relative to the C-ring 72. The O-ring 76 and the wall defining the cylindrical bore 44 cooperate to define a clearance area A2 circumferentially extending between the outer circumferential surface of the O-ring 76 and the wall surface surrounding the cylindrical bore 44. The clearance area A2 corresponds to the radial clearance C2 and it is a non-seal area relative to the O-ring 76. The relationship between the clearance areas A1 and A2 is indicated as A1>A2. In a case where the clearance area A1 is relatively greater because of a large closed gap of the C-ring 72, the clearance area A2 may be reduced to such a smaller value that the sealing effect of the O-ring 76 can be increased. Thus, the O-ring 76 can serve for enhancing the sealing of the radial clearance between the rotor 46 and the wall surface surrounding the cylindrical bore 44.

Figure 7:
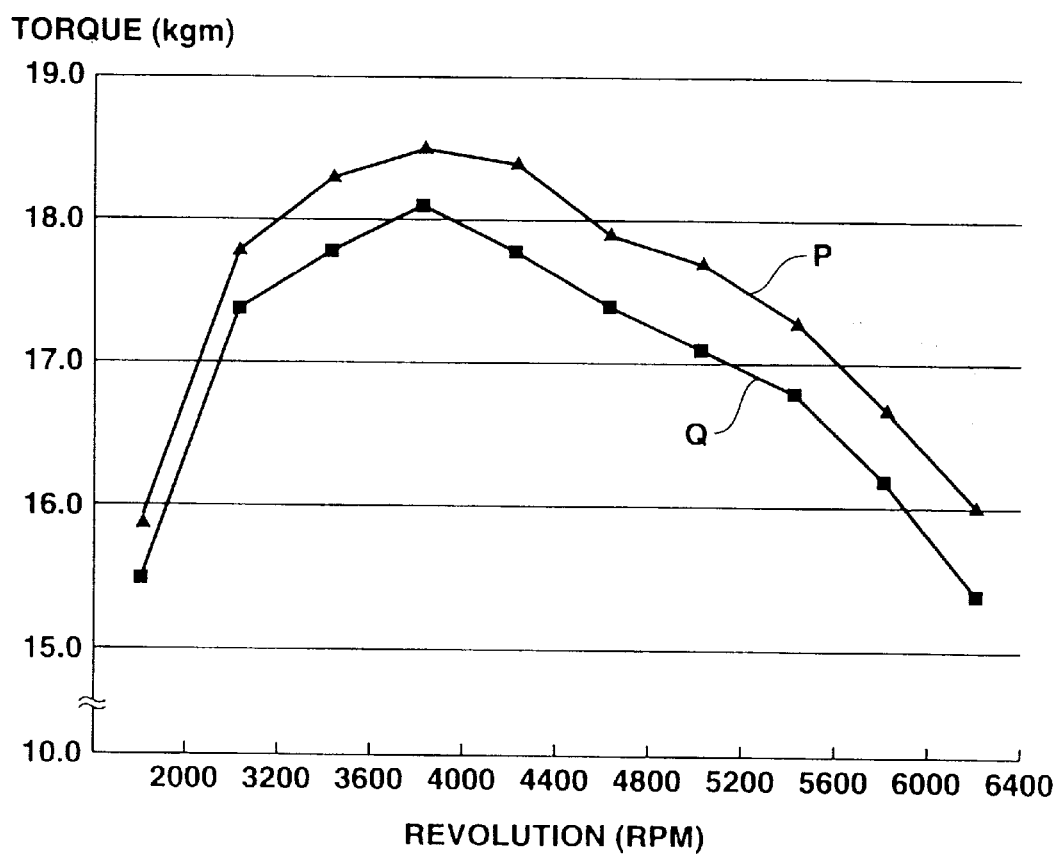
FIG. 7 is a graphical illustration showing a relationship between torque output and engine revolution exhibited in the embodiment of the present invention and the relationship therebetween exhibited in a comparative example.

With the above-described arrangement of the C-rings 72 and the O-rings 76, the sealing effect can be increased as compared with the sealing effect in a case where only the C-rings 72 are used. FIG. 7 illustrates the torque output P obtained using this embodiment and the torque output Q obtained using a comparative arrangement in which no O-ring is used and the C-rings are disposed on the wall portions between the communication passages. The torque output P and Q of the engine were obtained by variable intake control in which the rotor is in the closed position at a predetermined low-revolution range and in the open position at a high-revolution range higher than the predetermined low-revolution range. As illustrated in FIG. 7, the torque output P was increased by 4–5% at maximum in all revolution ranges as compared with the torque output Q.

Although the intake manifold 12 and the rotor 46 are made of synthetic resin materials as described above, the rotary valve assembly and the induction system according to the present invention can eliminate undesirable properties of the materials and establish the noise-reduction effect.

The apparatus of the present invention is not limited to the aforementioned embodiment applied to the variable intake system of the engine, it may be applied to a so-called swirl control valve adapted to promote swirl in engine cylinders by closing one of intake ports of each cylinder. Further, the apparatus of the present invention may be applied to a general rotary valve used for controlling flow passing through substantially parallel multiple passages.

This application is based on Japanese Patent Application No. 10-369519, filed on Dec. 25, 1998, the entire contents of which, inclusive of the specification, claims and drawings, are hereby incorporated by reference herein.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A rotary valve assembly for controlling flow passing through substantially parallel passages, comprising:
    a valve housing including a cylindrical bore extending transverse to the passages and a wall surface defining the cylindrical bore;
    a rotor having a longitudinal rotation axis and rotatable supported at opposed ends thereof within said cylindrical bore, said rotor including a plurality of axially spaced valves adapted to open and close the passages, and a plurality of wall portions disposed between the axially spaced valves and adapted for isolating the passages;
    a first ring disposed on the respective axially spaced wall portion of said rotor in sealing contact with the wall surface of said valve housing; and
    a second ring adapted for reducing radial vibration of said rotor and cooperating with said first ring to prevent leakage flow through the adjacent passages, said second ring being disposed axially adjacent to said first ring,
    wherein the rotor includes a first groove receiving the first ring and a second groove receiving the second ring, said first and second grooves circumferentially extending on the wall portion of the rotor, said first groove and said first ring cooperating to define a first radial clearance between a bottom of the first groove and an inner circumferential surface of the first ring, said valve housing and said second ring cooperating to define a second radial clearance between the wall surface of the valve housing and an outer circumferential surface of the second ring, said second radial clearance being smaller than said first radial clearance.

2. A rotary valve assembly as claimed in claim 1, wherein the rotor includes a first groove receiving the first ring and a second groove receiving the second ring, said first and second grooves circumferentially extending on the wall portion of the rotor, said first groove and said first ring cooperating to define a first clearance area circumferentially extending between a bottom of the first groove and an inner circumferential surface of the first ring, said valve housing and said second ring cooperating to define a second clearance area circumferentially extending between the wall surface of the valve housing and an outer circumferential surface of the second ring, said second clearance area being smaller than said first clearance area.

3. A rotary valve assembly as claimed in claim 1, wherein the second ring is placed near a loop of the radial vibration of the rotor.

4. A rotary valve assembly as claimed in claim 1, wherein the first ring is a C-ring and the second ring is an O-ring.

5. A rotary valve assembly as claimed in claim 1, wherein the valve housing and the rotor are made of synthetic resin materials, respectively.

6. A rotary valve assembly as claimed in claim 1, wherein the first ring is made of an expandably resilient material and the second ring is made of a contractibly resilient material.

7. A rotary valve assembly as claimed in claim 6, wherein the expandably resilient material is selected from metal and resin and the contractibly resilient material includes synthetic rubber.

8. An engine induction system for providing air to multiple cylinders, comprising:
    an intake manifold including a main collector chamber commonly connected to the cylinders, a plurality of branch passages extending substantially parallel to each other and connecting the main collector chamber and the cylinders, an auxiliary collector chamber disposed substantially parallel to the main collector chamber, a plurality of communication passages connecting the branch passages with the auxiliary collector chamber, a cylindrical bore extending transverse to the communication passages, and a wall surface defining said cylindrical bore;
    a rotor having a longitudinal rotation axis and rotatable supported at opposed ends thereof within said cylindrical bore, said rotor including a plurality of axially spaced valves adapted to open and close the communication passages and a plurality of wall portions disposed between the axially spaced valves and adapted for isolating the communication passages;
    a first ring disposed on the respective wall portion of the rotor in sealing contact with the wall surface of the intake manifold; and
    a second ring adapted for reducing a radial vibration of the rotor and cooperating with said first ring to prevent leakage flow through the adjacent communication passages, said second ring being disposed axially adjacent to said first ring, and
    wherein the rotor includes a first groove receiving the first ring and a second groove receiving the second ring, said first and second grooves circumferentially extending on the wall portion of the rotor, said first groove and said first ring cooperating to define a first radial clearance between the bottom of the first groove and an inner circumferential surface of the first ring, said intake manifold and said second ring cooperating to define a second radial clearance between the wall surface of the intake manifold and an outer circumferential surface of the second ring, said second radial clearance being smaller than said first radial clearance.

9. An engine induction system as claimed in claim 8, wherein the second ring is placed near a loop of the radial vibration of the rotor.

10. An engine induction system as claimed in claim 9, wherein said plurality of branch passages include six branch passages and said plurality of communication passages include six communication passages corresponding to six cylinders, said first ring including rings disposed on axially spaced wall portions, respectively, said second ring including two rings that are disposed on the wall portion between the second and third communication passages and the wall portion between the fourth and fifth communication passages, respectively.

11. An engine induction system as claimed in claim 8, wherein said first groove and said first ring cooperate to define a first clearance area circumferentially extending between a bottom of the first groove and an inner circumferential surface of the first ring, said intake manifold and said second ring cooperating to define a second clearance area circumferentially extending between the wall surface of the intake manifold and an outer circumferential surface of the second ring, said second clearance area being smaller than said first clearance area.

12. An engine induction system as claimed in claim 8, wherein the first ring is a C-ring and the second ring is an O-ring.

13. An engine induction system as claimed in claim 8, wherein the intake manifold and the rotor are made of synthetic resin materials, respectively.

14. An engine induction system as claimed in claim 8, wherein the first ring is made of an expandably resilient material and the second ring is made of a contractibly resilient material.

15. An engine induction system as claimed in claim 14, wherein the expandably resilient material is selected from metal and resin and the contractibly resilient material includes synthetic rubber.

16. A rotary valve assembly comprising:
   a wall defining a cylindrical bore:
      a shaft disposed within said cylindrical bore with a radial gap between said wall and said shaft, said shaft having a rotation axis and rotatably supported at opposed ends thereof, said shaft including a plurality of axially spaced valves;
      a ring adapted to reduce radial vibration of said shaft as well as serve for sealing said radial gap;
      a ring support supporting said ring, said ring support being disposed near a loop of the radial vibration of said shaft; and
      a plurality of seal rings including a seal ring disposed axially adjacent to said ring, said seal ring cooperating with said ring to increase sealing of said radial gap, and
   wherein the ring support includes a wall portion disposed on the shaft between the valves, and a first groove circumferentially extending on the wall portion and receiving the ring,
   wherein the plurality of seal rings are supported on wall portions disposed on the shaft between the valves, each of said wall portions being formed with a second groove circumferentially extending thereon and receiving the seal ring, and
   wherein the ring and the wall cooperate to define a first radial clearance between an outer circumferential surface of the ring and a wall surface of the wall surrounding the cylindrical bore, and the seal ring and the second groove cooperate to define a second radial clearance between an inner circumferential surface of the seal ring and a bottom of the second groove, said first radial clearance being smaller than said second radial clearance.

17. A rotary valve assembly as claimed in claim 16, wherein the ring is an O-ring and the seal ring is a C-ring.

18. A rotary valve assembly as claimed in claim 16, wherein the wall and the shaft are made of synthetic resin materials, respectively.

19. A rotary valve assembly as claimed in claim 16, wherein the first ring is made of an expandably resilient material and the second ring is made of a contractibly resilient material.

20. A rotary valve assembly as claimed in claim 19, wherein the expandably resilient material is selected from metal and resin and the contractibly resilient material includes synthetic rubber.

21. A rotary valve assembly as claimed in claim 19, wherein the expandably resilient material is selected from metal and resin and the contractibly resilient material includes synthetic rubber.

22. A rotary valve assembly comprising:
   a wall defining a cylindrical bore:
      a shaft disposed within said cylindrical bore with a radial gap between said wall and said shaft, said shaft having a rotation axis and rotatable supported at opposed ends thereof, said shaft including a plurality of axially spaced valves;
      a ring adapted to reduce radial vibration of said shaft as well as serve for sealing said radial gap;
      a ring support supporting said ring, said ring support being disposed near a loop of the radial vibration of said shaft; and
      a plurality of seal rings including a seal ring disposed axially adjacent to said ring, said seal ring cooperating with said ring to increase sealing of said radial gap, and
   wherein the ring support includes a wall portion disposed on the shaft between the valves, and a first groove circumferentially extending on the wall portion and receiving the ring,
   wherein the plurality of seal rings are supported on wall portions disposed on the shaft between the valves, each of said wall portions being formed with a second groove circumferentially extending thereon and receiving the seal ring, and
   wherein the ring and the wall cooperate to define a first clearance area circumferentially extending between an outer circumferential surface of the ring and a wall surface of the wall surrounding the cylindrical bore, and the seal ring and the second groove cooperate to define a second clearance area circumferentially extending between an inner circumferential surface of the seal ring and a bottom of the second groove, said first clearance area being smaller than said second clearance area.

23. A rotary valve assembly as claimed in claim 22, wherein the ring is an O-ring and the seal ring is a C-ring.

24. A rotary valve assembly as claimed in claim 22, wherein the wall and the shaft are made of synthetic resin materials, respectively.

25. A rotary valve assembly as claimed in claim 22, wherein the first ring is made of an expandably resilient material and the second ring is made of a contractibly resilient material.

26. A rotary valve assembly for controlling flow passing through substantially parallel passages, comprising:
   a valve housing including a cylindrical bore extending transverse to the passages and a wall surface defining the cylindrical bore;
   a rotor having a longitudinal rotation axis and rotatably supported at opposed ends thereof within said cylindrical bore, said rotor including a plurality of axially spaced valves adapted to open and close the passages, and a plurality of wall portions disposed between the axially spaced valves and adapted for isolating the passages;

a first C-ring disposed on the respective axially spaced wall portion of said rotor in sealing contact with the wall surface of said valve housing; and a second O-ring adapted for reducing radial vibration of said rotor and cooperating with said first C-ring to prevent leakage flow through the adjacent passages, said second O-ring being disposed axially adjacent to said first C-ring.

27. An engine induction system for providing air to multiple cylinders, comprising:

an intake manifold including a main collector chamber commonly connected to the cylinders, a plurality of branch passages extending substantially parallel to each other and connecting the main collector chamber and the cylinders, an auxiliary collector chamber disposed substantially parallel to the main collector chamber, a plurality of communication passages connecting the branch passages with the auxiliary collector chamber, a cylindrical bore extending transverse to the communication passages, and a wall surface defining said cylindrical bore;

a rotor having a longitudinal rotation axis and rotatably supported at opposed ends thereof within said cylindrical bore, said rotor including a plurality of axially spaced valves adapted to open and close the communication passages and a plurality of wall portions disposed between the axially spaced valves and adapted for isolating the communication passages;

a first ring disposed on the respective wall portion of the rotor in sealing contact with the wall surface of the intake manifold: and a second ring adapted for reducing a radial vibration of the rotor and cooperating with said first ring to prevent leakage flow through the adjacent communication passages, said second ring being disposed axially adjacent to said first ring and placed near a loop of the radial vibration of the rotor, and wherein said plurality of branch passages include six branch passages and said plurality of communication passages include six communication passages corresponding to six cylinders, said first ring including rings disposed on axially spaced wall portions, respectively, said second ring including two rings that are disposed on the wall portion between the second and third communication passages and the wall portion between the fourth and fifth communication passages, respectively.

28. An engine induction system for providing air to multiple cylinders, comprising:

an intake manifold including:
a main collector chamber commonly connected to the cylinders,
a plurality of branch passages extending substantially parallel to each other and connecting the main collector chamber and the cylinders,
an auxiliary collector chamber disposed substantially parallel to the main collector chamber;
a plurality of communication passages connecting the branch passages with the auxiliary collector chamber,
a cylindrical bore extending transverse to the communication passages, and
a wall surface defining said cylindrical bore;

a rotor having a longitudinal rotation axis and rotatably supported at opposed ends thereof within said cylindrical bore, said rotor including a plurality of axially spaced valves adapted to open and close the communication passages and a plurality of wall portions disposed between the axially spaced valves which are adapted to isolate the communication passages;

a first C-ring disposed on the respective wall portion of the rotor in sealing contact with the wall surface of the intake manifold; and a second O-ring adapted for reducing a radial vibration of the rotor and cooperating with said first C-ring to prevent leakage flow through the adjacent communication passages, said second O-ring being disposed axially adjacent to said first C-ring.

29. A rotary valve assembly, comprising:

a wall defining a cylindrical bore:
a shaft disposed within said cylindrical bore with a radial gap between said wall and said shaft, said shaft having a rotation axis and rotatably supported at opposed ends thereof, said shaft including a plurality of axially spaced valves;

an O-ring adapted to reduce radial vibration of said shaft as well as serve for sealing said radial gap;

a ring support supporting said O-ring, said ring support being disposed near a loop of the radial vibration of said shaft; and a plurality of seal rings including a C-ring disposed axially adjacent to said O-ring, said C-ring cooperating with said O-ring to increase sealing of said radial gap.

* * * * *